(12) United States Patent
Roussie

(10) Patent No.: US 11,739,862 B2
(45) Date of Patent: Aug. 29, 2023

(54) TUBING COMPONENT HAVING A CLADDING OF FILLET WELD, AND METHOD FOR PRODUCING A TUBING COMPONENT

(71) Applicant: Vallourec Tube-Alloy, LLC, Houston, TX (US)

(72) Inventor: Gabriel Roussie, Boulogne Billacourt (FR)

(73) Assignee: Vallourec Tube-Alloy, LLC, Houston, TX (US)

( * ) Notice: Subject to any disclaimer, the term of this patent is extended or adjusted under 35 U.S.C. 154(b) by 414 days.

(21) Appl. No.: 17/025,785

(22) Filed: Sep. 18, 2020

(65) Prior Publication Data

US 2022/0090708 A1  Mar. 24, 2022

(51) Int. Cl.
| | |
|---|---|
| *F16L 9/18* | (2006.01) |
| *B23K 31/02* | (2006.01) |
| *F16L 9/02* | (2006.01) |
| *F16L 59/065* | (2006.01) |
| *B23K 101/06* | (2006.01) |

(52) U.S. Cl.
CPC ............... *F16L 9/18* (2013.01); *B23K 31/02* (2013.01); *F16L 9/02* (2013.01); *F16L 59/065* (2013.01); *B23K 2101/06* (2018.08)

(58) Field of Classification Search
CPC ... F16L 9/18; F16L 9/02; F16L 59/075; F16L 59/065; B23K 31/02; B23K 39/005; B23K 2101/06
USPC .................... 138/114, 109; 285/123.1, 120.1
See application file for complete search history.

(56) References Cited

U.S. PATENT DOCUMENTS

| | | | | |
|---|---|---|---|---|
| 3,786,878 A | * | 1/1974 | Chapman ............... | F16L 39/005 |
| | | | | 175/215 |
| 2015/0300125 A1 | * | 10/2015 | Rekin ..................... | E21B 17/00 |
| | | | | 138/109 |
| 2017/0356590 A1 | * | 12/2017 | Jackson ................... | F16L 7/00 |

FOREIGN PATENT DOCUMENTS

DE          2626813 A  * 12/1977  ........... B23K 9/0282

* cited by examiner

*Primary Examiner* — Patrick F Brinson
(74) *Attorney, Agent, or Firm* — Christensen O'Connor Johnson Kindness PLLC

(57) ABSTRACT

Disclosed is a tubing component for the oil and gas industry. The tubing component includes an outer tube and an inner tube within the outer tube, said tubes being so configured to create a space between each other over a specified length. Each end of the inner tube is secured to the internal surface of the outer tube by a frustoconical fillet weld so that said space is leak-tight. The inner tube has a first internal diameter ID along a first length starting from each end of said tube, and a second, smaller internal diameter ID' along a second length beyond the first length. The tubing component further includes a protective metallic layer extending at least over the fillet weld. Also disclosed is a method for producing this tubing component.

33 Claims, 3 Drawing Sheets

TUBING COMPONENT HAVING A CLADDING OF FILLET WELD, AND METHOD FOR PRODUCING A TUBING COMPONENT

FIELD

The present disclosure relates to the field of vacuum insulated tubing for use in oil and gas wells. The present disclosure further relates to cladding of a fillet welding for vacuum insulated tubing and methods for making this cladding of a fillet welding. In particular, the present disclosure relates to vacuum insulated tubing for high pressure and high temperature conditions.

BACKGROUND

In the domain of oil and gas wells, an annular pressure buildup increases the pressure in the wellbore casing annulus. It is the pressure generated by the thermal expansion of trapped wellbore fluids as they are heated in the wellbore during production. Other terms are also used to describe this occurrence such as "trapped annular pressure" and "annular fluid expansion." The casing used to extract oil and gas is therefore submitted to extreme pressure and temperature conditions. The casing can collapse under pressure and cause the loss of the well.

Vacuum insulated tubing is a known device for use in such wells to mitigate the annular pressure buildup. Referring to FIG. 1, shown is a prior art vacuum insulated tubing 1.

Vacuum insulated tubing is a tubing component placed in a well, and connected to the production tubing such that production fluids like oil and gas flow through the tubing component. The vacuum insulated tubing 1 has a vacuum space 2 between the inner and the outer tubes 3 and 4 of the vacuum insulated tubing 1 to improve the thermic isolation between the inside of the inner tube and the outside of the outer tube 4. The vacuum space 2 is formed with a fillet welding 5 between the end of the inner tube 3 and the outer tubes 4.

However, in some high pressure and high temperature wells, the pressure of the well can be so great that no known vacuum insulated tubing can meet design requirements for a sufficient strength. Moreover, the fillet weld between the inner and outer tubes of existing vacuum insulated tubing are highly prone to corrosion, oil or H2S being for example highly corrosive. Such damage is very problematic as it can result in the loss of vacuum in the space between the inner and outer tube of the tubing. A High-Velocity Oxygen Fuel coating over the fillet weld has been tempted to protect the fillet weld from the corrosion, although this solution does not meet design requirements for high pressure and high temperature wells. Attempts have also been made with laser cladding. However, laser cladding requires tight machining tolerance on the surface to be cladded, that is not compatible with current vacuum insulated tubing assembly techniques.

What is needed is a vacuum insulated tubing capable of resisting the corrosion and high pressures and temperatures without collapsing and without losing vacuum. Finally, what is needed is a way and a method to produce with high precision this vacuum insulated tubing.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In general, in one aspect, the disclosure relates to a tubing component including an outer tube and an inner tube within the outer tube, said tubes being so configured to create a space between each other over a specified length. Each end of the inner tube is secured to the internal surface of the outer tube by a frustoconical fillet weld so that said space is leak-tight. The inner tube has a first internal diameter along a first length starting from each end of said tube and a second, smaller internal diameter along a second length beyond the first length. The tubing component further includes a protective metallic layer extending at least over the fillet weld.

In another aspect, the disclosure relates to a method for producing a tubing component as described above. The method includes providing, before assembly, an inner tube with a first internal diameter along a first length starting from each end of said tube and a second, smaller internal diameter along a second length beyond the first length. It further includes positioning the inner tube within the outer tube, welding each end of the inner tube to the internal surface of the outer tube so as to produce a frustoconical fillet weld that secures the tubes to each other so that said space is leak-tight, and forming a protective metallic layer that extends at least over the weld.

DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

In one embodiment, a vacuum insulated tubing for mitigating annular pressure buildup in a wellbore casing annulus of an oil or gas well is provided having an ability to withstand high pressure and high temperature conditions and to resist to oil and H2S corrosion.

Figure 1:
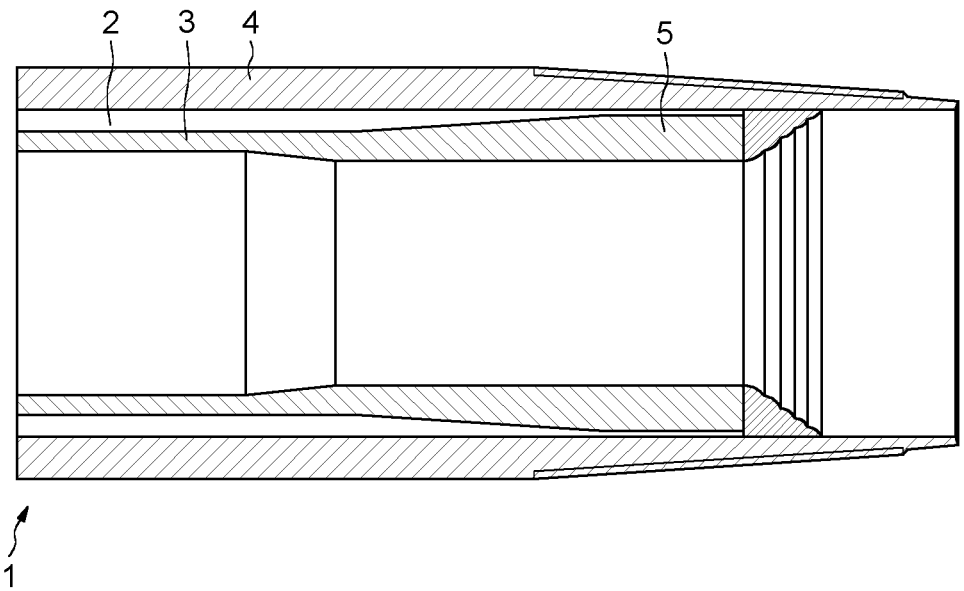
FIG. 1 shows a cross-sectional view of a prior art example of a tubing component.
Figure 2:
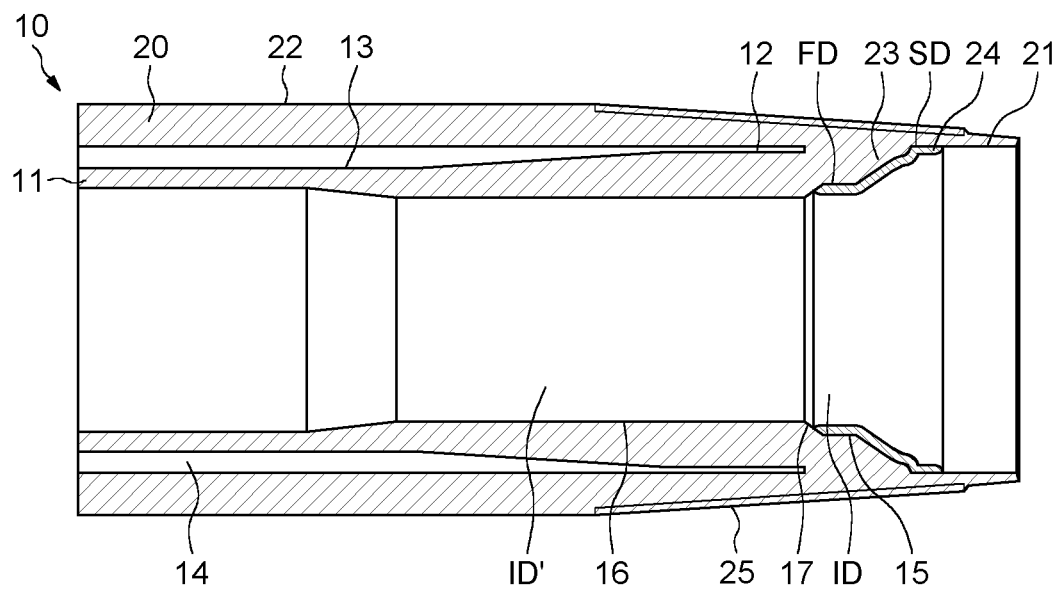
FIG. 2 shows a cross-sectional view of an example of tubing component according to the invention.

Referring to FIG. 2, one example embodiment of one end of the vacuum insulated tubing 10 of the present disclosure is shown. The vacuum insulated tubing 10, also referred to as the tubing component 10, has an inner tube 11, having a maximum outer diameter 12, a minimum outer diameter 13 defining a vacuum space 14.

The inner tube 11 has a first internal diameter ID along a first length 15 starting from each of the very end of said tube. The inner tube 11 has also a second, smaller internal diameter ID' along a second length 16 beyond the first length 15. For example, the first length 15 has a length of 12.7 mm, the first internal diameter ID has a diameter of 96.5 mm and the second internal diameter ID' has a diameter of 91 mm. The inner tube 11 comprises a bevel 17 between said first and second length 15 and 16. This bevel 17 makes for example an angle of 60° with a transversal plane. For the bevel 17 to be long enough, the difference ID-ID' is larger than 5 mm. The bevel 17 is created during manufacturing of the inner tube 11.

The tubing component 10 also has an outer tube 20, having a constant inner diameter for its internal surface 21 and an outer diameter 22. The outer tube 20 fits around the inner tube 11 such that the end of the outer tube 20 extends beyond the inner tube 11. In one embodiment, the outer tube has an outer diameter of 155 mm. The inner tube can have a maximum outer diameter of 127 mm.

The outer tube 20 and the inner tube 11 can be made from a suitable material for providing the required strength. In one embodiment, the outer tube 20 and the inner tube 11 are made from an alloy having a yield strength of at least 125 ksi.

In one embodiment, the outer tube 20 and the inner tube 11 are made from a weldable chromium steel alloy comprising at least 13% of chromium, also referred to as 13Cr steel.

The vacuum space 14 is formed between the outer tube 20 and the inner tube 11, having a vacuum in between. The vacuum is created using any suitable technology employed in known vacuum insulated tubing manufacturing.

A weld, such as a frustoconical fillet weld 23, is formed at the corner between the end of the inner tube 11 and the internal surface 21 of the outer tube 20. It permits to join the inner and outer tubes 11 and 20 and to seal the vacuum of the vacuum space 14. The fillet weld 23 is made from a suitable weld material compatible with the 15Cr tubing.

A protective metallic layer 24 completely covers the surface of the fillet weld 23. The protective metallic layer 24 is an overlay weld obtained by Gas Tungsten Arc Welding or Tungsten Inert Gas welding, also referred to as cladding. The fillet weld 23 and the protective metallic layer 24 do not extend, i.e., protrude, beyond the first internal diameter ID of the inner tube 11; therefore, the second internal diameter ID' of the tubing component is not impacted by the fillet weld 23 and the protective metallic layer 24. In one embodiment, the protective metallic layer 24 has a thickness from about 3 mm to about 3.5 mm. For example, the thickness can be 3.2 mm. The protective metallic layer 24 can be formed by depositing the material in two passes. The protective metallic layer 24 material deposited in the two passes can have substantially the same thickness. For example, the thickness of each of the two passes can be 1.6 mm. In one embodiment, the surface of the fillet weld 23 is prepared prior to the deposition of the protective metallic layer 24 by beveling, modifying or polishing the fillet weld 23 to help ensure complete coverage and bonding of the fillet weld 23 by the overlay weld. The protective metallic layer 24 can extend beyond the edges of the fillet weld 23, e.g., 12.7 mm in the axial direction of the tubing component 10, to also cover the adjacent internal surfaces of the inner tube 11 and of the outer tube 20. For example, the first length 15 of the internal surface of the inner tube 11 can be overlaps, i.e. over a first specified distance FD for example of 12.7 mm. In one embodiment, the cladding of the protective metallic layer 24 is precisely done with respect to the bevel 17. A second specified distance SD for example of 12.7 mm can be overlaps on the internal surface 21 of the outer tube 20. In order not to protrude beyond the first internal diameter ID of the inner tube 11, the thickness of the protective metallic layer 24 is equal or smaller than (ID-ID')/2 over the first length 15, wherein the difference ID-ID' is larger than 4 mm, preferably larger than 5.5 mm. The protective metallic layer 24 can be thicker over the internal surface 21 of the outer tube 20.

The protective metallic layer 24 is made from a suitable overlay weld material for protecting the fillet weld 23 under the conditions the tubing component will experience in the field system. In one embodiment, the overlay weld material is made of a corrosion resistant nickel-based alloy such as an alloy including Nickel, Chromium and Molybdenum wherein Nickel amounts to more than 50%. In one embodiment, the protective metallic layer 24 material is Inconel 625, that permits an excellent bonding.

The dilution iron can be no more than 5% to 10% for corrosion resistance of the overlay weld. This is achieved by depositing the protective metallic layer 24 material in two passes by making a bottom layer and at least a top layer on top of the bottom layer in order to reduce dilution of iron near the free surface of the layer. The thickness of the protective metallic layer 24 is thus high. In order not to reduce the drift of the tubing component 10 because of this cladding, a first length 15 with a first internal diameter ID and the bevel 17 of the inner tube 11 have been designed, as described above. This first internal diameter ID is bigger than the second internal diameter ID' and permits to an existing design of tubing to house the cladding without reducing the drift. The first internal diameter ID is also small enough to allow the fillet weld to match with the tubing strength required and to facilitate the welding of the fillet weld 23.

The outer tube 20 can have external threads 25 along a portion of length proximate the end of the outer tube for attaching a coupling (not represented) having an internal threaded profile for connecting two outer tubes thereby connecting two segments of vacuum insulated tubing.

The protective metallic layer 24 provides the tubing component weld integrity which prevents corrosion or cracking of the fillet weld 23, thus protecting against loss of vacuum the vacuum space 14.

The vacuum insulated tubing is able to withstand higher pressures than known vacuum insulated tubing are capable of withstanding without collapsing and without losing vacuum.

Following will be introduced the method for producing a tubing component as disclosed with reference to the FIG. 3 to FIG. 6.

Figure 3:
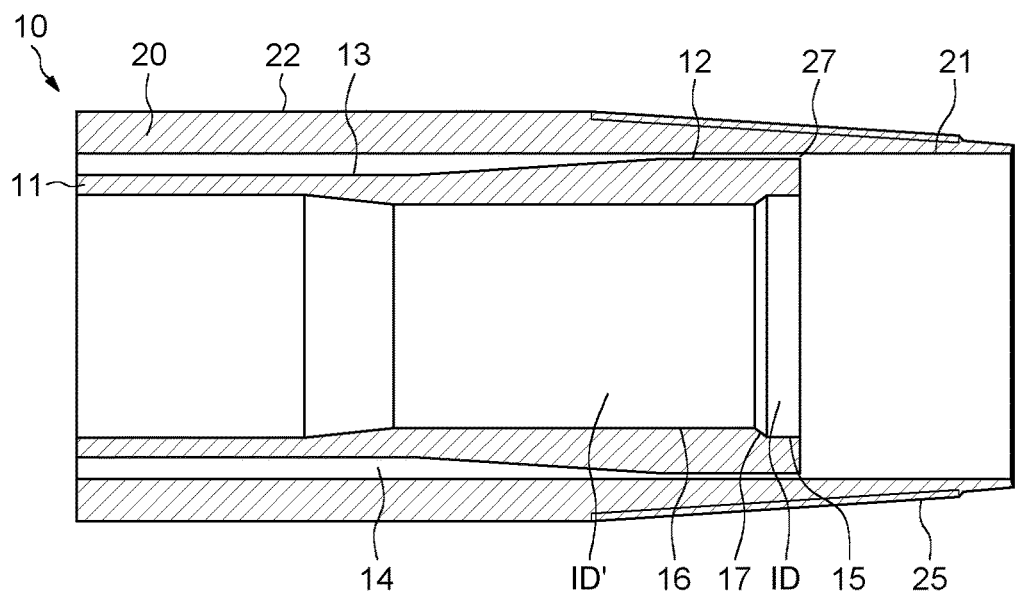
FIG. 3 shows a cross-sectional view of an inner tube inside an outer tube.

FIG. 3 illustrates the tubing component 10 after inserting an inner tube 11 inside an outer tube 20, as described above.

Figure 4:
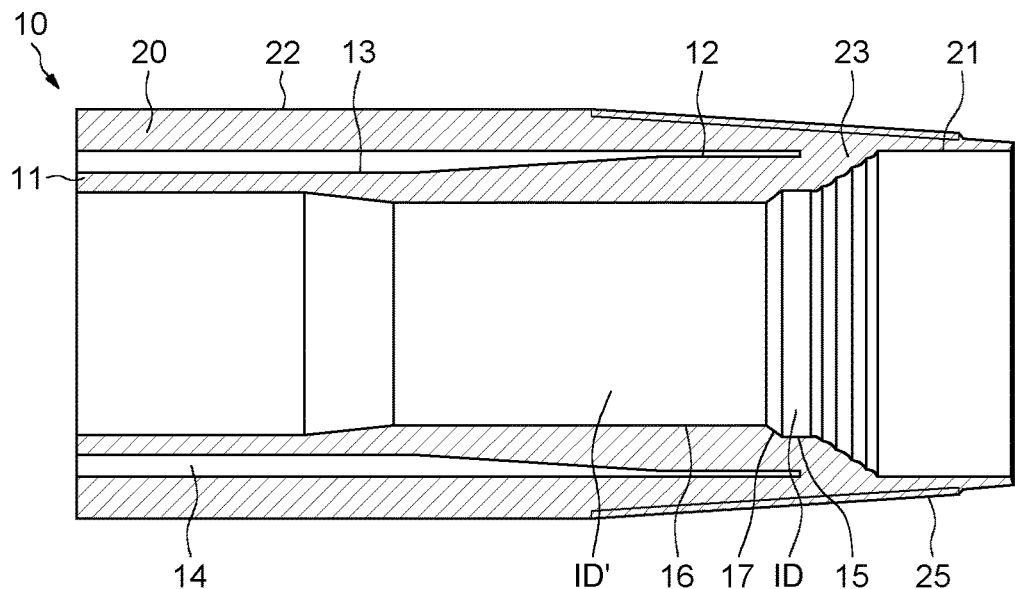
FIG. 4 shows a cross-sectional view of a tubing component with an inner tube inside an outer tube secured together by a fillet weld.

FIG. 4 illustrates the tubing component 10 after welding each end of the inner tube 11 to the internal surface 21 of the outer tube 20 so as to produce a frustoconical fillet weld 23 that secures the tubes to each other so that the vacuum space 14 is leak-tight.

Figure 5:
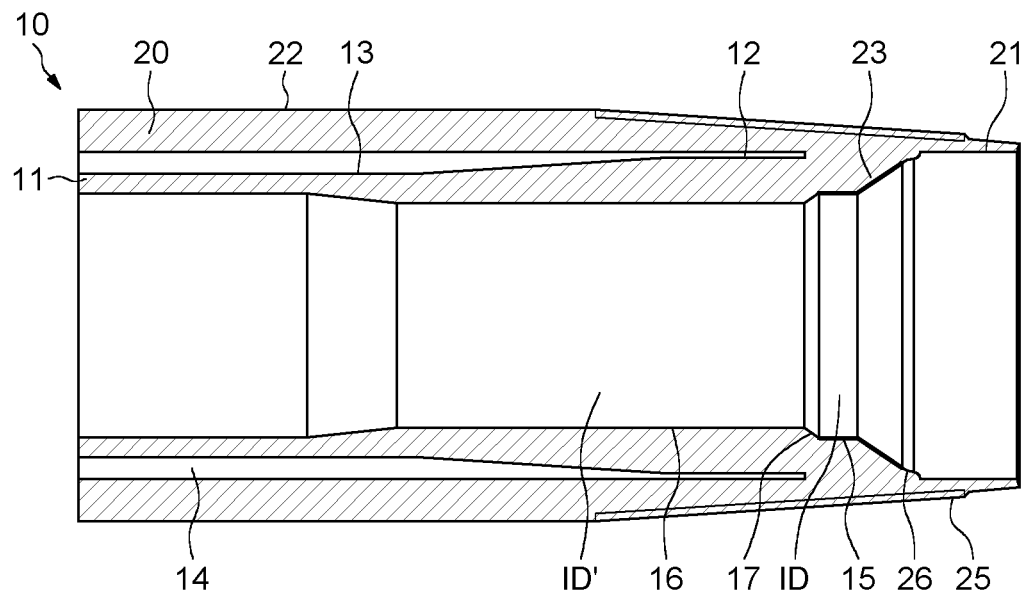
FIG. 5 shows a cross-sectional view of the tubing component of FIG. 4 after beveling of the fillet weld.

FIG. 5 illustrates the tubing component 10 after beveling the fillet weld 23. In particular, the tow 26 of the fillet weld 23 is not beveled to avoid reducing wall of the outer tube 20.

Figure 6:
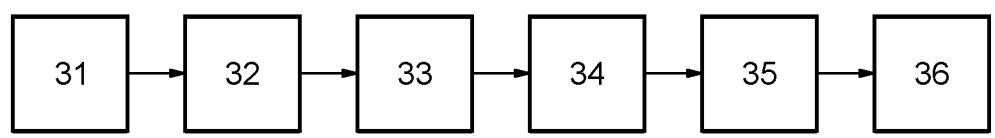
FIG. 6 is a flowchart of an example method for making a tubing component.

Referring to FIG. 6, in step 31, an inner tube 11 and an outer tube 20 are provided. In step 32, the outer tube 20 is positioned around the inner tube 11 in such a way that a corner 27 is formed at the intersection between the inner tube 11 and the outer tube 20 as shown in FIG. 3 and described above. In step 33, a fillet weld 23 is formed at the corner 27 as shown in FIG. 4 and described above. In step 34, the weld surface of the fillet weld 23 is beveled to remove faults, surfaces oxides, and facilitate application of the protective metallic layer 24 onto the weld surface as shown in FIG. 5 and described above. The beveling is achieved in order to obtain an angle between 50° and 60° between the fillet weld 23 and a transversal plan. For example, the angle can be 56.1°. The bevel 17 is used as a reference for depth control of the beveling step 34 and thus ensures that the weld remains strong enough. The bevel 17 being a reference for the production of the tubing component 10, it provides positive evidence that the weld after machining still has enough section to provide for the required strength. In the cladding step 35, the protective metallic layer 24 is formed over the fillet weld surface as shown in FIG. 2 and described above.

In step 36, the fillet weld 23 and the protective metallic layer 24 can be simultaneously heat treated (tempered) at a temperature greater than 800° F. in a stress-relieve operation. In one embodiment, the Post Weld Heat Treatment is processed on a zone centered on the protective metallic layer 24, and extending axially of 12.7 mm on each side of the protective metallic layer 24. The stress relieve equipment uses a low frequency induction to limit the risk with non-magnetic material interface response.

It should be noted that only the components relevant to the disclosure are shown in the figures, and that other components normally part of a wellbore or vacuum insulated tubing may not be shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a kind of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

While illustrative embodiments have been illustrated and described, it will be appreciated that various changes can be made therein without departing from the spirit and scope of the invention.

The embodiments of the invention in which an exclusive property or privilege is claimed are defined as follows:

1. A tubing component, comprising an outer tube and an inner tube within the outer tube, said tubes being so configured to create a space between each other over a specified length, wherein a. each end of the inner tube is secured to the internal surface of the outer tube by a frustoconical fillet weld so that said space is leak-tight, b. the inner tube has
      i. a first internal diameter ID along a first length starting from each end of said tube,
      ii. a second, smaller internal diameter ID' along a second length beyond the first length, c. the tubing component further includes a protective metallic layer extending at least over the fillet weld.

2. The tubing component of claim 1 wherein the protective metallic layer is an overlay weld.

3. The tubing component of claim 2 wherein the overlay weld is obtained by Gas Tungsten Arc Welding or Tungsten Inert Gas welding.

4. The tubing component of claim 1 wherein the protective metallic layer is made of a corrosion resistant nickel-based alloy.

5. The tubing component of claim 1 wherein the protective metallic layer further extends beyond the fillet weld towards the inside of the inner tube and towards the inside of the outer tube.

6. The tubing component of claim 1 wherein the protective metallic layer overlaps the internal surface of the inner tube over a first specified distance.

7. The tubing component of claim 1 wherein the protective metallic layer overlaps the internal surface of the inner tube over said first length.

8. The tubing component of claim 1 wherein the protective metallic layer overlaps the internal surface of the outer tube over a second specified distance.

9. The tubing component of claim 6 wherein the thickness of the protective metallic layer is equal or smaller than (ID-ID')/2 over the first specified distance.

10. The tubing component of claim 1 wherein the difference ID-ID' is larger than 4 mm.

11. The tubing component of claim 1 wherein the inner tube comprises a bevel between said first and second lengths.

12. The tubing component of claim 1 wherein the outer tube is made of steel.

13. The tubing component of claim 1 wherein the inner tube is made of steel.

14. The tubing component of claim 1 wherein the outer tube includes external threads at least at one end to enable connection to a tubular element.

15. The tubing component of claim 1 wherein the tubing component is for the oil and gas industry, especially for high-pressure, high-temperature well conditions.

16. A method for producing a tubing component comprising an outer tube and an inner tube within the external tube, said outer and inner tubes being so configured to create a space between each other over a specified length, the method comprising:

a. providing, before assembly, an inner tube with:
      i. a first internal diameter ID along a first length starting from each end of said tube,
      ii. a second, smaller internal diameter ID' along a second length beyond the first length, b. positioning the inner tube within the outer tube, c. welding each end of the inner tube to the internal surface of the outer tube so as to produce a frustoconical fillet weld that secures the tubes to each other so that said space is leak-tight, d. forming a protective metallic layer that extends at least over the weld.

17. The method of claim 16 wherein the protective metallic layer is an overlay weld.

18. The method of claim 17 wherein the overlay weld is obtained by Gas Tungsten Arc Welding or TIG Tungsten Inert Gas welding.

19. The method of claim 16 wherein the protective metallic layer is made of a corrosion resistant nickel-based alloy such as an alloy.

20. The method of claim 16 wherein the protective metallic layer further extends beyond the fillet weld towards the inside of the inner tube and towards the inside of the outer tube.

21. The method of claim 16 wherein the protective metallic layer overlaps the internal surface of the inner tube over a first specified distance.

22. The method of claim 16 wherein the protective metallic layer overlaps the internal surface of the inner tube over said first length.

23. The method of claim 16 wherein the protective metallic layer overlaps the internal surface of the outer tube over a second specified distance.

24. The method of claim 21 wherein the thickness of the metallic layer is equal or smaller than (ID-ID')/2 over the first specified distance.

25. The method of claim 16 wherein the difference ID-ID' is larger than 4 mm.

26. The method of claim 16 wherein the inner tube comprises a bevel between said first and second lengths.

27. The method of claim 16 wherein the protective metallic layer is formed in two passes by making a bottom layer and at least a top layer on top of the bottom layer in order to reduce dilution of iron near the free surface of the layer.

28. The method of claim 16 further includes a beveling operation on the fillet weld to remove surface oxides, said beveling operation preferably being made after said welding and before forming the protective metallic layer.

29. The method of claim 16 further includes a stress-relieve operation by a Post Weld Heat Treatment.

30. The method of claim 16 wherein the outer tube is made of steel, preferably stainless steel.

31. The method of claim 16 wherein the inner tube is made of steel, preferably stainless steel.

32. The method of claim 16 wherein the outer tube includes external threads at least at one end to enable connection to a tubular element.

33. The method of claim 16 wherein the tubing component is for the oil & gas industry, especially for high-pressure, high-temperature well conditions.

* * * * *